United States Patent [19]

Heimke

[11] 4,030,755
[45] June 21, 1977

[54] METHOD AND APPARATUS FOR FLUIDIFYING POWDEROUS SUBSTANCES

[75] Inventor: Wolfram Heimke, Antibes, France

[73] Assignee: Union Industrielle et d'Entreprise, Paris, France

[22] Filed: Dec. 31, 1975

[21] Appl. No.: 645,641

[30] Foreign Application Priority Data

Apr. 2, 1975 France .................. 75.10247

[52] U.S. Cl. .................. 302/29; 222/195; 259/DIG. 17; 302/53
[51] Int. Cl.² .................. B65G 53/16
[58] Field of Search .......... 302/29, 45, 52, 53, 302/54, 66, 1, 17; 222/195; 259/DIG. 17

[56] References Cited

UNITED STATES PATENTS

| 2,353,346 | 7/1944 | Logan | 222/195 X |
| 3,713,564 | 1/1973 | Cottrell | 222/195 X |
| 3,929,261 | 12/1975 | Solimar | 302/53 X |

FOREIGN PATENTS OR APPLICATIONS

| 22,540 | 1/1962 | Germany | 302/29 |
| 1,909,219 | 9/1970 | Germany | 222/195 |

*Primary Examiner*—Evon C. Blunk
*Assistant Examiner*—James L. Rowland
*Attorney, Agent, or Firm*—Burgess, Ryan and Wayne

[57] ABSTRACT

A method of fluidifying powderous substances which are in contact with a wall, wherein the surface of the wall in contact with said substances is provided with at least one substantially semi-lenticular chamber delimited by said surface and by a flattened dome made of a resiliently flexible material. The invention also relates to an apparatus for carrying out this method.

6 Claims, 4 Drawing Figures

METHOD AND APPARATUS FOR FLUIDIFYING POWDEROUS SUBSTANCES

The present invention relates to a method of fluidifying powderous substances which are in contact with a wall, as well as to an apparatus adapted to implement the same.

Handling and carrying powderous subtances is known to be difficult due to their tendency to settle and to agglomerate. This particularly applies to hoppers fed with powderous substances indeed in many cases hoppers have to be provided with rather complicated devices, comprising mechanical transmission means, to ensure a complete draining and avoid especially the formation of so-called "arches". This also applies to the conveyors for powderous substances.

Various solutions have already been suggested with a view to coping with these problems.

Especially it is know, to provide the bottom of a hopper with tubes projecting inside said hopper, each tube being closed at its end and perforated in its part located within the hopper. A resilient sleeve surrounds each tube, thus obturating the perforations, and the tube is connected through suitable valves to a source of pressurized gaseous fluid. When the communication between the tube and the source is established, the pressurized fluid pushes the sleeve away from the tube wall and the thus resulting gas stream fluidifies locally the powderous substance. However, such a device is inoperative in the zone of the bottom of the hopper, which is never completely drained, and moreover preferential relieve paths are created within the mass of substances. Furthermore, the perforations of the tubes have generally a small diameter and they may be more or less clogged by the substance which penetrates the space between the tube and the resilient sleeve.

Another known solution comprises providing the bottom with a sintered plate and a cloth through which an air stream is blown. However, if the air is not dry, the filter thus formed becomes clogged and preferential flow paths appear within the mass of powderous substance, which prevents a complete draining.

It is a main object of the present invention to provide a method which can be carried out in a particularly simple manner and which overcomes the above-mentioned drawbacks.

The novel method of the invention for fluidifying powderous substances which are in contact with a wall, particularly the wall of a hopper or of a conveyor, comprises the steps of providing the surface of the wall in contact with said substances with at least one substantially semi-lenticular chamber delimited by said surface and by the arch of a flattened dome made of a resiliently flexible material, the free edge of the dome resting freely on said surface and being forced against it by an elastic axial return effet of the dome towards the wall, introducing into the chamber, through at least one passage provided in the wall, a pressurized gaseous fluid in such a manner that said free edge is periodically disengaged from said surface, whereby said fluid flows radially between the disengaged free edge and the wall and thus fluidifies the powderous substance in the vicinity of said dome.

Due to this novel method, the gas streams which ensure the fluidification are, at the beginning, distributed over the entire periphery of the substantially semi-lenticular chamber and flow initially along the surface of the wall, which ensures a particularly efficient cleaning of the bottom.

This method may be applied to any powderous solid and is particularly suitable for cement, bentonite and baryte. As will be seen in more detail, the passages provided in the wall for the admission of the gaseous fluid may have a large diameter, which eliminates the risks of clogging.

The present invention provides also an apparatus for carrying out the method according to the invention.

According to the invention, said apparatus adapted to be fastened to a wall, is wholly made of a flexible material and comprises a flattened dome the arch of which is connected to an axial holding base adapted to penetrate a hole in the wall and having for that purpose a tapered end, the base comprising furthermore near said end an annular blocking shoulder having a larger diameter than that of the hole provided in the wall and adapted to receive said base, the distance between the plane of the annular shoulder and the plane containing the lower edge of the dome being smaller than the thickness of said wall.

To set up the apparatus, the holding base has simply to be introduced into the hole provided for that purpose in the wall, which operation is facilitated by the tapered shape of the base and the resilient nature of the material, until the blocking shoulder has passed through the hole, whereafter the shoulder engages the surface of the wall and thus locks the apparatus in this position. As the distance between said shoulder and the plane containing the lower edge of the dome is smaller than the thickness of the wall, said lower edge of the dome is then forced against the surface of the wall, the pressure of the edge against the surface being the higher as the difference between the thickness of the wall and the distance shoulder-dome edge is greater.

According to one particular feature of the invention, the free edge of the dome forms an annular rim having a substantially circular section. This rim engages the wall when the apparatus is mounted and thus the substantially semi-lenticular chamber described with reference to the method according to the invention is formed between the dome and the wall surface. To enable the fluid to be introduced into said chamber, one or more passages are provided in the wall in front of the dome.

Other objects and advantages will become apparent from the following detailed description which is to be taken in conjunction with the accompanying drawings illustrating preferred embodiments of the invention and wherein.

Figure 1:
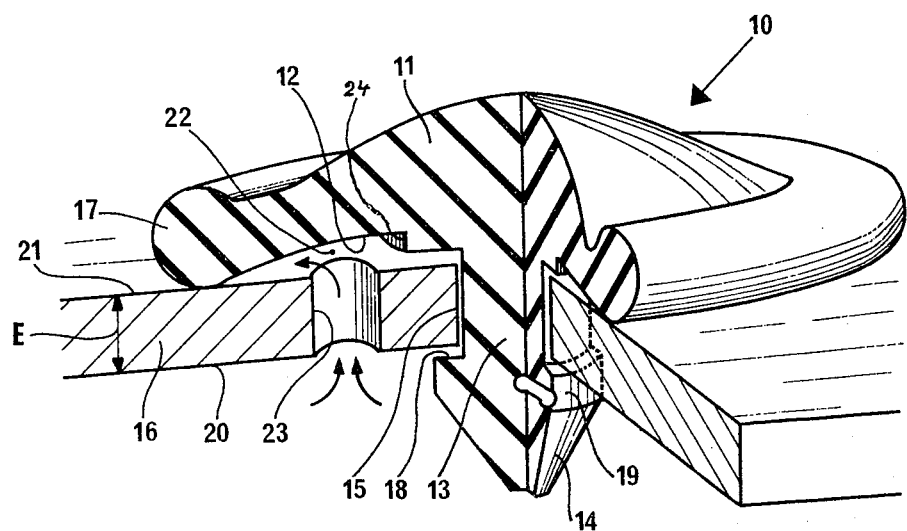
FIG. 1 is a perspective view, partly in section, of an embodiment of the apparatus according to the invention, mounted onto a wall.
Figure 2:
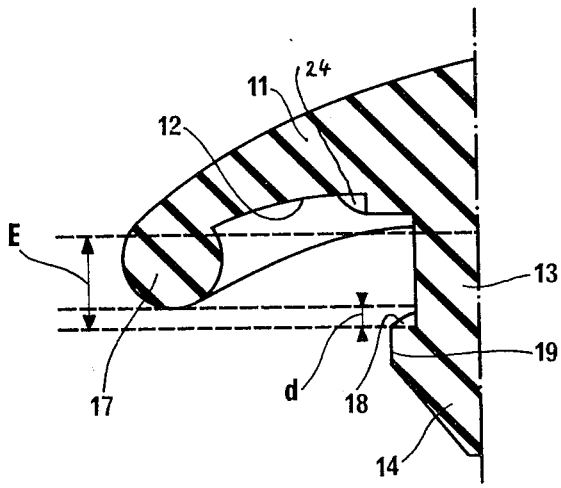
FIG. 2 is a partial sectional view of the same apparatus, while not mounted onto a wall.

Referring to FIG. 1 and 2 of the drawings, the apparatus 10 according to the illustrated embodiment of the invention comprises a flattened dome 11 the arch 12 of which is connected to an axial holding base 13. Said base 13 is provided with a tapered free end 14 intended to facilitate the penetration into a hole 15 provided in the wall 16 having a thickness E. The free edge of the dome 11 is constituted by an annular rim 17 of a substantially circular section.

Near its end 14, the base 13 is provided with an annular shoulder 18 acting as a stop or blocking means and having a cylindrical portion 19 the diameter of which is greater than that of the hole 15. The base 13, in its central part above shoulder 18, forms a cylinder having a diameter slightly smaller than that of the hole 15.

The dimensions of the apparatus 10 are such that the distance d between the plane 20 containing the lower free edge of dome 11 and the plane 21 of the shoulder 18 (FIG. 2) is smaller than the thickness E of the wall.

Thus, when the apparatus 10 is positioned by introducing the base 13 into the hole 15 until the shoulder 18 has passed through said hole, thus blocking the device as said shoulder 18 engages the surface 20 of wall 16 (FIG. 1), the dome 11 flattens on the opposite surface 21 of the wall and the free edge of the dome is resiliently forced onto said surface 21 which receives the powderous substance, said surface being for example the inner surface of a hopper.

The apparatus 10 is wholly made of a resilient material, e.g. natural or synthetic rubber and more advantageously of a neoprene having a Shore hardness ranging from 60 to 70.

A substantially semi-lenticular chamber 22 is thus provided between the arch 12 and the surface 21 of the wall 16 when the apparatus 10 is mounted on the wall.

Passages 23 (only one of them is represented on FIG. 1) provided in the wall 16 and opening into chamber 22, enable a pressurized gaseous fluid to be introduced into said chamber, said fluid being constituted for example by air under a pressure of about 3 bars.

Under the action of said fluid, a pulsed disengagement of the dome edge is achieved, whereby the air escapes radially between said edge and the surface 21, which results in fluidifying the powderous substance.

It will be noted that passages 23 may have a relatively large diameter, thus avoiding any clogging of said passages by the powderous substance.

Furthermore, it should be noted that the apparatus according to the invention is also advantageous in that it contains no mechanical parts, which prevents, contrary to the so-called "bubble-cap" device, any risk of binding or misfunction. The resilient axial return force of the dome towards the wall is wholly due to the shape of the apparatus and to the nature of the material it is made of.

Owing to that functional reliability, the method according to the invention and the apparatus used for carrying out the same are particularly suitable for submarine operations where no possibility of access or intervention exists.

In the embodiment illustrated in FIG. 1 and 2, the central base 13 is provided with a second shoulder 24 in front of the shoulder 18 and near the arch 12, the distance between said shoulders 18 and 24 being larger than the thickness E. The shoulder 24 can avoid a possible collapse of the dome under the action of the substance lying on it.

Figure 3:
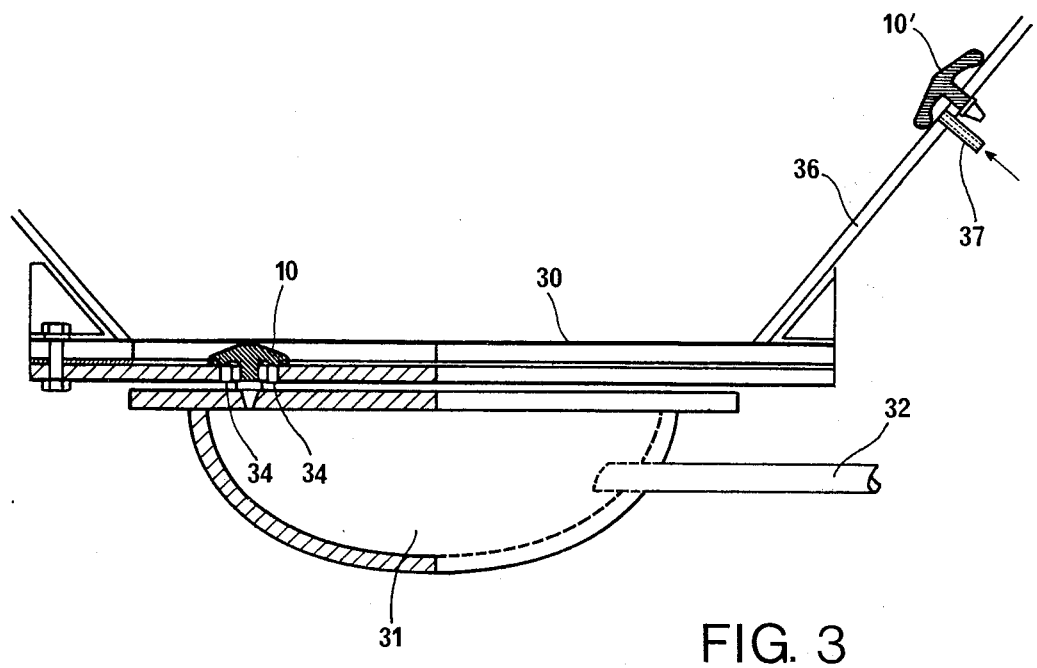
FIG. 3 illustrates diagrammatically a blowing manifold fitted on the bottom of a silo.

FIG. 3 illustrates an embodiment of the invention wherein the bottom 30 of a silo fitted with a blowing manifold 31 into which opens a tube 32 dispensing air under pressure. The bottom 30 is provided with a series of apparatus 10 (only one of which is represented) the various chambers of which are connected to the manifold through passages 34.

The walls 36 of the cone of the silo are also provided with apparatus 10' fed through the tubes 37 and intended to eliminate arches which may have been created.

Figure 4:
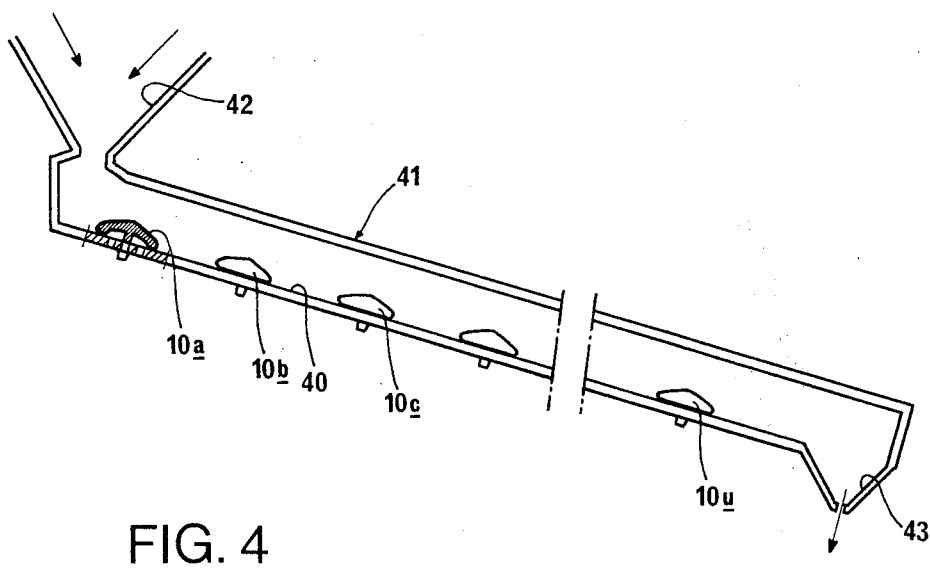
FIG. 4 illustrates diagrammatically a conveyor fitted with apparatus according to the invention.

The apparatus according to the invention may also be applied to pneumatic transfer techniques. FIG. 4 illustrates an example of application to a pneumatic conveyor. The bottom 40 of an inclined spout 41 is provided with a series of apparatus 10a, 10b ... 10n, similar to the apparatus 10 previously described, which can be successively supplied with compressed air. The powderous substances to be carried are poured at the top of the spout in 42 and, in order to enable them to go down, the apparatus 10a ... 10n are successively fed. The substances are thus fluidified and they go down by gravity along the spout to a dispensing hopper 43.

The apparatus according to the invention can also be used for fluidizing powderous solids.

It should be understood that the present invention is not limited to the embodiments described herein and shown in the appended drawings.

What is claimed is:

1. An apparatus for fluidifying powderous substances which are in contact with a wall such as the wall of a hopper or a conveyor, said apparatus being entirely made of a resilient material and comprising a substantially circular flattened dome the arch of which is integrally connected at its concave side to an axially extending substantially cylindrical holding stud adapted to be inserted into a circular mounting hole provided to this end in said wall, said stud having a tapered end and being provided near said tapered end with an annular blocking shoulder having a diameter larger than that of said mounting hole, the distance between the plane containing the surface of said annular blocking shoulder and the plane containing the lower annular edge of said dome prior to insertion of said apparatus into said mounting hole being substantially smaller than the thickness of said wall, the arrangement being such that when said holding stud is inserted in said mounting hole provided in said wall and said blocking shoulder engages one surface of said wall, the concave side of said dome forms with the opposite surface of said wall a substantially semi-lenticular chamber adapted to be connected to a source of pressurized fluid through an inlet hole provided in said wall at a location adjacent said mounting hole.

2. The apparatus of claim 1, wherein the peripheral edge portion of said dome is constituted by an annular rim having a substantially circular cross-section.

3. The apparatus of claim 1, wherein said axially extending substantially cylindrical holding stud is provided with a second annular shoulder arranged adjacent said arch of the dome and facing said annular blocking shoulder, the axial distance between said two annular shoulders being substantially larger than the thickness of said wall.

4. The apparatus of claim 1, wherein said resilient material is Neoprene having a Shore hardness between 60 and 70.

5. An apparatus for fluidifying powderous substances which are in contact with a wall such as the wall of a hopper or a conveyor, said apparatus being entirely made of a resilient material and comprising a substantially circular flattened dome the arch of which is integrally connected at its concave side to an axially extending substantially cylindrical holding stud adapted to be inserted into a substantially circular mounting hole provided to this end in said wall, said stud having a tapered end and being provided near said tapered end with an annular blocking shoulder having a diameter larger than that of said mounting hole, the distance between the plane containing the surface of said annular blocking shoulder and the plane containing the lower annular edge of said dome prior to insertion of the stud into the mounting hole being substantially smaller than the thickness of said wall, the peripheral edge portion of said dome being constituted by an annular rim having a substantially circular cross-section, and said axially extending stud being provided with a second annular shoulder arranged adjacent said arch of the dome and facing said annular blocking shoulder, while the axial distance between said two shoulders is substantially larger than the thickness of said wall, the arrangement being such that when said holding stud is inserted in said mounting hole provided in said wall and said blocking shoulder engages one surface of said wall, the concave side of said dome forms with the opposite surface of said wall a substantially semi-lenticular chamber adapted to be connected to a source of pressurized fluid through an inlet hole provided in said wall at a location adjacent said mounting hole.

6. The apparatus of claim 5, wherein said resilient material is Neoprene having a Shore hardness between 60 and 70.

* * * * *